Patented Feb. 2, 1943

2,309,962

UNITED STATES PATENT OFFICE 2,309,962

COATED FIBRO-CEMENT PRODUCT

Charles E. Kraus, Sparks, Md.

No Drawing. Application April 22, 1939,
Serial No. 269,532

5 Claims. (Cl. 117—126)

This invention relates to a coated fibro-cement product; more particularly to color coated asbestos-cement products such as shingles, sidings, slabs, boards, tiles, and the like.

Pigmented sodium silicate coatings have heretofore been used on products of this character with indifferent success because of the facts that they are not durable, and that they are apt to develop cracks, checks and blisters during the heat treatment to which they are subjected in the curing process. Furthermore, the proper curing of the coating requires a high degree of heat which requires time and is apt to injure the fibro-cement base.

The primary objects of my invention are to provide a fibro-cement product that has a homogeneous, insoluble, pigmented silicate coating, forming a hard, dense film on the coated surface of the product, which coating is firmly bonded to the surface, is highly resistant to the effects of weather, and will not crack, check or blister, either in the curing process or in use.

A further object is to provide the product with a colored silicate coating of such character that it can be cured and set at lower temperatures than have heretofore been employed, thus materially reducing the cost of manufacture.

The coating that I apply is highly thixotropic which prevents the pigment from settling out of the film, and results in producing a uniform, homogeneous coating.

In making the coating, I employ in the vehicle colloidal clays of different characteristics, both in respect of reversibility, and of giving up or combining with water. One type of colloidal clay that has been found to be satisfactory is a black or dark colored halloysite of a kind that is naturally impregnated with oil. This clay has inherent colloidal properties that are developed by releasing the oil. Upon release of the oil, the material becomes an irreversible colloidal clay. Another type of colloidal clay that may be used is the ordinary white or light colored halloysite which is a reversible or partly reversible colloidal clay. A third type of colloidal clay that may be used is bentonite in partly reversible colloidal form.

The use of a reversible colloidal clay alone is unsatisfactory in that it would soon leach out. This is overcome by employing either an irreversible colloidal clay, or a mixture of irreversible and reversible or partly reversible colloidal clays. Preferably, the mixture contains a preponderance of the irreversible colloidal clay, although the clays may be mixed in substantially equal proportions by weight.

Ammonium hydroxide (26° Baumé) and water, in suitable proportions, are added to the colloidal clay or clays, and the mixture is then boiled, and ground to colloidal dimensions through a colloid mill. A silicate of soda solution (40° Baumé) in varying percentages is added. I then add an agglutinating or homogenizing agent having a low melting or softening point, and which is not reactive with silicate of soda at room temperature.

As the agglutinating or homogenizing agent, I use such materials as naphthalene, coal tar, asphalt, waxes, and the like having a melting or softening range between 140° F. and 300° F.

The functions of this agent are to lower the effective temperature at which the silicate will become insoluble; to produce microscopic pores or openings in the coating during the early stages of its setting or curing, thereby permitting the moisture and gases to escape without forming cracks or blisters; and subsequently, in the later stages of setting or curing, to cause the composition to film over and to agglutinate the colloids and the silicate of soda into a homogeneous film, closing the pores and forming a substantially imperforate coating.

I have found that the addition of a small percentage of alcohol, preferably methyl alcohol, or a mild acid solution is desirable. A mild solution of any suitable acid, either mineral or organic, may be used, such for example as a 5% sulphuric acid solution, a 5% hydrochloric acid solution, or a 10% tannic acid solution.

For use with fibro-cement products that possess a very high absorption, I find that the addition of organic gels such as agar agar, starch, and the like assists in raising the thixotropic behavior of the vehicle.

The various ingredients or components of the coating composition may be mixed in various proportions. The mixture is ground to the desired degree of fineness in a suitable paint mill.

By way of illustration, but not of limitation, I cite two typical examples of coatings suitable for use on fibro-cement products:

Example 1

|  | By weight (per cent) |
|---|---|
| Non-reversible colloidal clay (white halloysite) | 6.65 |
| Partly reversible colloidal clay (bentonite) | 1.8 |
| Ammonium hydroxide (26° Baumé) | 0.15 |
| Water | 8.3 |

Boil; grind through a colloidal mill; then add:

| Silicate of soda (40° Baumé) | 54.6 |
|---|---|
| Water | 9.6 |
| Methyl alcohol | 0.3 |
| Naphthalene | 2.2 |
| White pigment (titanium oxide) | 16.4 |

Grind through a paint mill.

Example 2

| Non-reversible colloidal clay (white halloysite) | 2.95 |
|---|---|
| Non-reversible oil-impregnated colloidal clay (halloysite) | 2.95 |
| Ammonium hydroxide (26° Baumé) | 0.1 |
| Water | 5.8 |

Boil; grind through a colloid mill; then add:

| Silicate of soda (40° Baumé) | 52.4 |
|---|---|
| Water | 18.8 |
| Methyl alcohol | 0.3 |
| Naphthalene | 1.5 |
| Green pigment | 15.2 |

Grind through a paint mill.

The coating composition is applied to the product by brushing, spraying, dipping, or any other suitable manner, and the coating is then set or cured by the application of heat of not more than about 600° F. to 700° F. The heat may be applied gradually in a suitable oven or heating chamber while the coated product travels therethrough. During the application of the heat, the presence of the relatively low melting agglutinating agent forms pores of minute or microscopic size in the coating that, as hereinbefore noted, permit the escape of the moisture and gases before the silicate coating reaches its insoluble state.

If desired, the product may be preheated before being coated, and either one or more films or coats of the coating composition may be applied.

One serious objection to use of the ordinary pigmented liquid compositions containing silicates of the alkaline metals, such as sodium silicate, for coating asbestos-cement products is that too much of the silicate solution is dispersed into the product, thus tending to filter or separate the pigment from the vehicle and leaving it on the surface not well bonded.

With the use of my improved coating, having high thixotropic properties, immediate gelatination is effected when the coating is applied to the product. This avoids undue absorption of the composition into the pores of the fibro-cement and results in a firm and tenacious bonding of the pigment on the coated surface.

What I claim is:

1. A coated fibro-cement product consisting of a sheet of fibro-cement surfaced with a homogeneous, uniform, imperforate, insoluble pigmented coating comprising the thermal reaction products of sodium silicate and halloysite in substantially irreversible colloidal form.

2. A coated fibro-cement product consisting of a sheet of fibro-cement surfaced with a homogeneous, uniform, imperforate, insoluble pigmented coating comprising the thermal reaction products at a temperature of not more than about 600° to 700° F. of a silicate of an alkaline metal and halloysite.

3. A fibro-cement product consisting of an asbestos-cement base having an insoluble, substantially imperforate, firmly bonded pigmented surface coating comprising the thermal reaction products at a temperature of not more than about 600° to 700° F. of halloysite, silicate of soda, and naphthalene.

4. A fibro-cement product consisting of an asbestos-cement base having an insoluble, substantially imperforate, firmly bonded pigmented surface coating comprising the thermal reaction products at a temperature of not more than about 600° to 700° F. of halloysite, bentonite, silicate of soda, and naphthalene.

5. A fibro-cement product consisting of an asbestos-cement base having an insoluble, substantially imperforate, firmly bonded pigmented surface coating comprising the thermal reaction products, at a temperature of not more than 700° F., of halloysite, silicate of soda, and an agglutinating agent that volatilizes below 300° F.

CHARLES E. KRAUS.